United States Patent [19]

Eiraku

[11] 4,108,541

[45] Aug. 22, 1978

[54] ELECTRICALLY CONTROLLED REAR-VIEW MIRROR WITH TWO COAXIAL ROCKING SYSTEMS

[75] Inventor: Kunihiro Eiraku, Tokyo, Japan

[73] Assignee: Mitsui Mining & Smelting Co., Ltd., Tokyo, Japan

[21] Appl. No.: 771,790

[22] Filed: Feb. 24, 1977

[30] Foreign Application Priority Data

Feb. 27, 1976 [JP] Japan ............................ 51-20729

[51] Int. Cl.² .............................................. G02B 5/08
[52] U.S. Cl. .................................................. 350/289
[58] Field of Search ............... 350/289, 6, 7; 248/487; 74/501 M

[56] References Cited

U.S. PATENT DOCUMENTS

| | | | |
|---|---|---|---|
| 2,855,825 | 10/1958 | Feder ................................ | 74/501 M |
| 3,027,807 | 4/1962 | Barcus et al. ....................... | 350/289 |
| 3,063,342 | 11/1962 | Zeek .................................... | 350/189 |
| 3,286,545 | 11/1966 | Malachowskf ..................... | 74/501 M |
| 3,352,524 | 11/1967 | Rossi ................................... | 74/501 M |
| 3,549,243 | 12/1970 | Horwitt et al. ...................... | 350/289 |
| 3,666,354 | 5/1972 | Russeil ............................... | 74/501 M |

Primary Examiner—Jon W. Henry
Attorney, Agent, or Firm—Flynn & Frishauf

[57] ABSTRACT

The electrically controlled rear-view mirror of this invention comprises a mirror unit with a mirror attached to the surface thereof, first and second rocking systems for continuously reciprocatively rocking the specular surface of said mirror with first and second axes at an angle to each other as the centers, respectively, at cycles different from each other, a single electric driving motor for stopping said mirror at a position substantially in the desired direction by driving and stopping both said rocking systems simultaneously.

8 Claims, 2 Drawing Figures

ELECTRICALLY CONTROLLED REAR-VIEW MIRROR WITH TWO COAXIAL ROCKING SYSTEMS

This invention relates to an electrically controlled rear-view mirror, in which the angle of inclination of mirror may be adjusted electrically.

There have conventionally been used a variety of electrically controlled rear-view mirrors with the inclination of mirrors electrically adjustable. In any of these rear-view mirrors, having two sets of rocking systems for inclining the mirror vertically and horizontally respectively, the above-mentioned adjustment was made by connecting a driving motor optionally to said rocking systems by means of an electric clutch and reversing the motor at need. Accordingly, there was usually employed a 4-motion changeover switch to operate the electric clutch and reverse the rotation of the motor. This type of electrically controlled rear-view mirror, however, required a limit switch for avoiding application of mechanical impact to the mirror when it reaches the limit position of rocking, a relay for stopping the motor according to the operation of the limit switch, and other auxiliary members or circuits, providing intricate configuration of the device, higher cost and the like disadvantages. Other types of conventional electrically controlled rear-view mirrors were not relieved of the substantially similar disadvantages either.

An object of this invention is to offer an electrically controlled rear-view mirror capable of being stopped at a position substantially in the desired direction by only driving and stopping a single electric driving means.

SUMMARY OF THE INVENTION

In order to attain the above-mentioned object, the electrically controlled rear-view mirror of this invention comprises a mirror unit with a mirror attached to the surface thereof facing to operator or backward, a first rocking system for continuously reciprocatively rocking said mirror unit or the specular surface of said mirror with a first axis as the center, a second rocking system for continuously reciprocatively rocking said mirror unit or the specular surface of said mirror at cycles not in common with said first rocking system with a second axis at an angle to said first axis as the center, a single electric driving means for driving and stopping both said rocking systems simultaneously and stopping said mirror at a position substantially in the desired direction, and a substrate mounting all said systems and means.

In the electrically controlled rear-view mirror of the invention having the aforementioned construction, the mirror is rocked by the single electric driving means centering around the first and second axes simultaneously, so that we can obtain such advantages that any auxiliary members or electric circuits to complicate the device may be eliminated; no clutch or other changeover system is required to be provided between said electric driving means and mirror unit, and the mirror need not be reversed while stopped at the terminal rocking position because both said rocking systems are so constructed as to be capable of continuously reciprocatively rocking, thereby eliminating necessity of e.g., limit switch, relay and means for reversing the rocking direction.

In this electrically controlled rear-view mirror, when said electric driving means is operated, the mirror unit or mirror rocks at two different cycles. Accordingly, the visual field of said mirror returns in situ after continuously scanning the backward scenery via routes deviating gradually with said cycles, so that the adjustment of the rear-view mirror is to be completed by stopping said electric driving means when the mirror has obtained the desired visual field. If you want to make fine adjustment of visual field or cannot wait until a cycle of scanning is completed, said driving means may be formed reversibly. In this case, it is convenient to use a reversible motor such as one with reduction gear and a 3-position switch for forwarding, reversing and stopping it.

The electrically controlled rear-view mirror of the invention has, besides the compactness of the structure as described above, further advantages that no impulsive force may be applied to the moving members because of no need of stopping the mirror at the limit position of rocking, thereby substantially eliminating occurrence of troubles, and that the mirror may be adjusted very easily.

According to a preferred embodiment of the invention, said first rocking system has a substantially cylindrical inner rotor rotatably supported by a center shaft erected on the substrate in the central axis direction of said rear-view mirror, the inner rotor having an inner inclined plate at a first prescribed angle to the principal plane perpendicular to said center shaft at the backward end portion and outside-toothed gear at the forward end portion, while said second rocking system has a substantially cylindrical outer rotor mounted on the outside of said inner rotor coaxially and rotatably, the outer rotor having an outer inclined plate placed at a second prescribed angle to said principal plane at the backward end portion and an inside-toothed gear at the forward end portion. Then, said mirror unit is connected to the backward end portion of said center shaft through a plurality of tension springs stretched between itself and said substrate and a pivot bearing, and is so formed as to have respective pairs of inner arms and outer arms for rocking with said first and second axes as the centers corresponding to the rotating position of both said inclined plates, extending forward from respective two separated positions in the directions of said first and second axes and brought into contact with said inner inclined plate and outer inclined plate respectively by the action of said tension springs. Further, as said electric driving means, thereby may be used a combination of an outside toothed driving gear, interposed between the outside-toothed gear on said inner rotor and the inside-toothed gear on said outer rotor and simultaneously engaging with both said gears, and an electric motor for driving said outside-toothed driving gear. It is convenient to use one, preferably a reversible motor, with a built-in reduction gear as said electric motor.

With the above-mentioned preferred embodiment, the mirror unit is rocked around the first and second axes through a single radius bared on the pivot bearing. This arrangement more decreases a space between the mirror unit and the mirror body for receiving said mirror unit than in the prior art device in which the mirror unit is rocked through two larger and smaller radii by separate bearings, thereby reducing an amount of foreign matter such as dust being carried into the rear-view mirror from the outside through said space and inconsequence admitting of the easy maintenance and long life of the subject electrically controlled rear-view mirror.

According to the aforementioned preferred embodiment of the invention, an electrically controlled rear-view mirror in compliance with the object of this invention may be obtained easily without employing any special mechanism.

DETAILED DESCRIPTION

Figure 1:
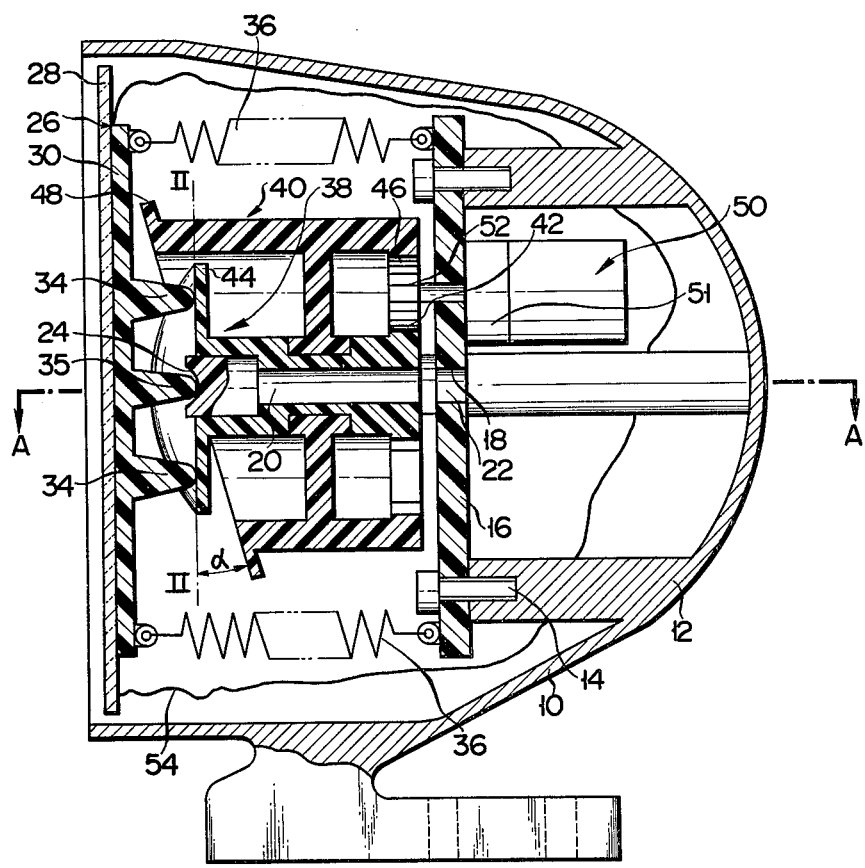
FIG. 1 is a longitudinal section of the electrically controlled rear-view mirror of this invention.
Figure 2:
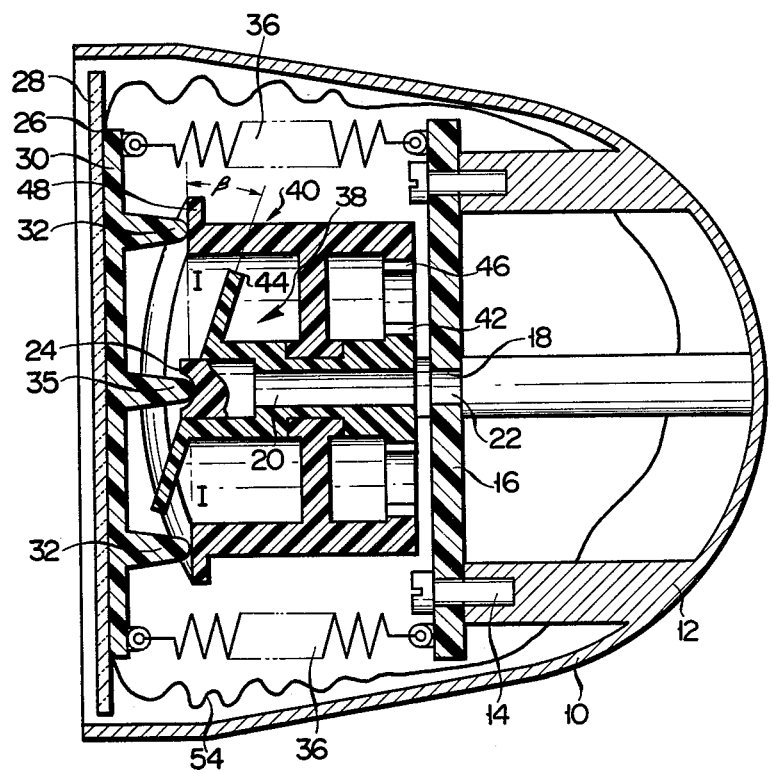
FIG. 2 is a sectional view of the rear-view mirror of FIG. 1 as taken along line A—A.

Referring to FIGS. 1 and 2, a substrate 16 is attached to supports 12 extending from a mirror body 10 by means of screws 14, a shaft end portion 22 of a center shaft 20 is tightly fitted in an opening 18 in the substrate 16, and the center shaft 20 extends perpendicular to the substrate 16. At the extended end of the center shaft 20 is formed a substantially spherical bearing surface 24, which sustains a pivot 35 provided at the center portion of a mirror unit 26 and forms a pivot bearing capable of inclining in all directions.

The mirror unit 26 comprises a mirror 28 and a mirror mounting plate 30. On the surface of the mirror mounting plate 30 is attached a mirror 28, while the reverse side thereof is provided with said pivot 35 extending from said mirror mounting plate 30 substantially at a right angle thereto and respective pairs of outer arms 32 and inner arms 34. The mirror unit 26 is pulled toward the substrate 16 by four tension springs 36 provided at the peripheral portions of the mirror unit 26 and is sustained by said pivot bearing at the center portion thereof.

A pair of inner arms 34 (FIG. 1) are arranged on both sides of the pivot 35 equidistantly separated therefrom in a first direction, while the outer arms 32 (FIG. 2) are arranged on both sides of the pivot 35 equidistantly separated therefrom in a second direction at an angle to said first direction. The inner arms 34 are located nearer to the pivot 35 than the outer arms 32. In this embodiment, said first and second directions are perpendicular to each other; said first direction is coincident with the vertical direction of FIG. 1, while said second direction is coincident with the direction perpendicular to the plane of the paper (FIG. 1) or transverse direction.

A first rocking system or inner rotor 38 is fitted rotatably to the periphery of the center shaft 20, while a second rocking system or outer rotor 40 is attached rotatably to the periphery of said rotor inner 38. An outside-toothed gear 42 is formed on one end or substrate 16 side of the inner rotor 38, while on the other end thereof is formed an inner inclined-plate 44 at a first prescribed angle or an angle of $\alpha°$ to the plane perpendicular to the center shaft (hereinafter referred to as principal plane). An inside-toothed gear 46 is formed on one end or substrate 16 side of the outer rotor 40, while on the other end thereof is formed an outer inclined-plate 48 at a second prescribed angle or an angle of $\beta°$ to said principal plane (FIG. 2).

The substrate 16 is provided with a motor 50, a part of an electrical driving means, with a reduction gear 51 with an outside-toothed driving gear 52 attached to the output shaft thereof, said outside-toothed driving gear 52 engaging with both outside-toothed gear 42 and inside-toothed gear 46. The motor 50 is one capable of being reversed by means of a change-over switch (not shown) placed suitably in the vicinity of the driver's seat. When the motor 50 is rotated, the inner rotor 38 and outer rotor 40 rotate at speeds different from each other in directions opposite to each other, thereby also rotating the inner- and outer-inclined plates 44 and 48 in the same manner. Thus, said gears 42, 46 and 52 rotate the inner and outer rotors 38 and 40.

Since the inner arms 34 and outer arms 32 are pressed against the inner inclined-plate 44 and outer inclined-plate 48 respectively by the tension springs 36, when the inner inclined-plate 44 rotates, the mirror unit 26 and hence the mirror 28 rocks reciprocatively through an angle of $\beta°$ at both sides or $2\beta°$ in total in the vertical direction with the straight line extending transversely through the center of the spherical tip end portion of the pivot 35 or the first axis I—I (FIG. 1) as the center, and, at the same time, rocks reciprocatively through an angle of $\alpha°$ at both sides or $2\alpha°$ in total in the transverse direction with the straight line extending vertically through said center of the tip end portion of the pivot 35 or the second axis II—II (FIG. 1) as the center. Thus, the inner rotor 38 and outer rotor 40 function as a vertical rocking system and a transverse rocking system respectively.

In FIG. 1, the transverse and vertical directions are substantially coincident respectively with the horizontal and vertical directions when in practical use of the rear-view mirror; the mirror 28 may have its angle changed yawingly by the transverse rocking and pitchingly by the vertical rocking.

Since the inside-toothed gear 46 has more teeth than the outside-toothed (spur) gear 42, the speed of transverse rocking of the mirror unit 26 is lower than that of vertical rocking, and the cycle of transverse rocking is longer than that of vertical rocking. Therefore, the visual field of the mirror 28 may perform scanning via successively varying routes within a visual range corresponding to $\pm\alpha°$ and $\pm\beta°$, so that one may obtain a visual field substantially in compliance with the desired one by stopping the motor 50 in the middle of the route before the initial visual field is restored. Further, one may also obtain quickly the visual field substantially in compliance with the desired one by correcting any overreaching of visual-field through operating said change-over switch to reverse the direction of motor 50.

In an example of practically a formed electrically controlled rear-view mirror, the number of teeth of the inside-toothed gear 46 is eighty-two, while that of the outside-toothed gear 42 is forty-eight. In this case, the mirror unit may rock forty-one times in the longitudinal direction while rocking twenty-six times in the transverse direction, enabling one to make a fine adjustment.

In this embodiment, the mirror mounting plate 30, center shaft 20, inner rotor 38, outer rotor 40 and substrate 16 are all made of plastic, which is helpful in securing quick actuation and stopping of the mirror unit 26 by starting and stopping the motor 50 as a result of reduced inertia of the rotating parts as well as in reducing the weight of the rear-view mirror. The above-mentioned members may be made of metals, as desired, while the rotating parts may be born by steel balls. A conventional universal joint may be used in lieu of the pivot bearing employing the pivot 28 and the bearing surface 24, or the bearing used may be of a type so constructed that a boss with a spherical bearing surface protrudes from the mirror unit 26 and a steel ball is interposed between the spherical bearing surface of said boss and the bearing surface 24 of the center shaft 20.

Further, while the motor 50 with a reduction gear 51 is used in this embodiment, a combination of a conventional motor and a specially designed reduction gear (not shown) may be also available. Furthermore, in driving the inner rotor 38 and outer rotor 40 in the opposite directions at speeds different from each other by means of the motor 50, both the rotors 38 and 40 and motor 50 may be formed with a suitably designed epicyclic train instead of employing the inside-toothed gear 40, outside-toothed gear 42 and outside-toothed driving gear as described above.

A protective cover 54 as shown in FIGS. 1 and 2, made of rubber or other flexible material, may be used for covering the interior mechanisms jointly with the mirror unit 26 extending across the opening portion thereof, thereby preventing rain, snow, dust, etc. from entering the interior.

As described hereinbefore, the electrically controlled rear-view mirror of this invention requires no clutch for change-over from transverse to longitudinal rocking (and vice versa), and is capable of obtaining a visual field substantially in compliance with a desired one with high accuracy in a short period of time by starting and stopping a single motor while changing the rotating direction at need. Further, there is no need for a stopping member to restrict the moving parts, so that any stopping system for the motor 50 accompanying the stopping member may be eliminated, and the motor driving switch may be a simple 3-motion switch for forward driving, reversing and stopping the motor. Thus, there is obtained an electrically controlled rearview mirror with simple structure and which is easy-to-operate, substantially trouble-free, and capable of being manufactured in low cost.

Although there has been described above the case wherein the mirror 28 rocks vertically by means of the inner inclined plate 44 and transversely by means of the outer inclined-plate 48, a modification may be effected by turning the extending positions of the inner and outer arms 34 and 32 around the center shaft 20 through an angle of 90° as compared with the case of FIG. 1 so that the mirror 28 may rock vertically and transversely by means of the outer inclined-plate 48 and inner inclined-plate 44 respectively. In this case, the rocking cycle in the vertical direction is to be rendered longer than that in the transverse direction.

Further, though the above-mentioned embodiment is illustrative of the case where the first and second directions are perpendicular to each other, where not so, if the inner arms 34 are pushed by the inner inclined plate 44 to incline the mirror unit 26, such inclination is to be made with the straight line passing through said center of the tip end portion of the pivot 35 and parallel to said second direction as the central axis, while, if the outer arms 32 are pushed by the outer inclined plate 48 to incline the mirror unit 26, such inclination is to be made with the straight line passing through said center of the tip end portion of the pivot 35 and parallel to said first direction as the central axis. In this electrically controlled rearview mirror, both rotors 38 and 40 are driven simultaneously, so that the mirror unit 26 or mirror 28 rock at the same time with both straight lines as the central axes, thereby allowing the visual field of the mirror 28 to scan over the visible range of said mirror. Accordingly, in the same way as the case of the former embodiment, one may obtain a visual field substantially in compliance with the desired one by properly starting and stopping the motor 50.

What is claimed is:

1. An electrically controlled rear-view mirror comprising:
    a mirror unit including a mirror having a specular surface attached to a surface thereof,
    a first rocking system coupled to said mirror unit for continuously reciprocatively rocking said mirror unit or the specular surface of said mirror at a first cycle with a first axis as the center,
    a second rocking system coupled to said mirror unit for continuously reciprocatively rocking said mirror unit or the specular surface of said mirror at a second cycle which is different from said first cycle and with a second axis as the center, said second axis being at an angle to said first axis,
    a single electric driving means coupled to said first and second rocking systems for driving and stopping both of said first and second rocking systems simultaneously to stop said mirror at a position substantially in the desired direction,
    a substrate carrying both said first and second rocking systems and said driving means, and
    a center shaft mounted to said substrate, the longitudinal axis of said center shaft defining a central axis of said rear-view mirror,
    said first rocking system including a substantially cylindrical inner rotor rotatably supported by said center shaft, the inner rotor having an inner inclined-plate coupled to said mirror and which is inclined at a first prescribed angle to a principal plane of said rear-view mirror, said principal plane being perpendicular to said central axis and being located in the vicinity of said inner inclined plate, and an outside-toothed gear on said inner rotor,
    said second rocking system including a substantially cylindrical outer rotor coaxially and rotatably mounted on the outerside of said inner rotor, the outer rotor having an outer inclined-plate coupled to said mirror and which is inclined at a second prescribed angle to said principal plane, said first and second prescribed angles being different, and an inside-toothed gear on said outer rotor, and
    said electric driving means being coupled to said toothed gears for turning said respective rotors to adjust the position of the mirror.

2. An electrically controlled rear-view mirror according to claim 1 wherein said center shaft has a forward portion in the vicinity of said substrate, and a rearward end in the vicinity of said inclined plates and principal plane, said outside-toothed gear of said inner rotor and said inside-toothed gear of said outer rotor being located at the forward end portions of said rotors which are adjacent said substrate.

3. An electrically controlled rear-view mirror according to claim 1 in which said central shaft has a forward portion adjacent said substrate and a backward end portion located in the vicinity of said inclined plates and said principal plane, and in which said mirror unit is pivotally connected to the backward end portion of said center shaft through a pivot bearing and through a plurality of tension springs stretched between said mirror unit and said substrate, said mirror unit having respective pairs of inner arms and outer arms for rocking with said first and second axes as the centers corresponding to the rotating positions of both of said inclined plates, said inner and outer arms extending forward toward said substrate and toward said inclined-plates from two respective separated positions in the directions of said first and second axes and contacting with said inner inclined plates and outer inclined plate, respectively, by the action of said tension springs.

4. An electrically controlled rear-view mirror according to claim 3 in which said electric driving means has an outside-toothed driving gear interposed between the outside-toothed gear on said inner rotor and the inside-toothed gear on said outer rotor and simultaneously engaging with both said gears, and an electric motor for driving said outside-toothed driving gear.

5. An electrically controlled rear-view mirror according to claim 4 in which said electric motor has a built-in reduction gear.

6. An electrically controlled rear-view mirror according to claim 4 in which said electric motor is a reversible motor.

7. An electrically controlled rear-view mirror according to claim 1 in which said first axis and second axis are perpendicular to each other.

8. An electrically controlled rear-view mirror according to claim 1 in which said electric driving means comprises gear means for simultaneously engaging both said outside-toothed gear on said inner rotor and said inside-toothed gear on said outer rotor, and an electric motor for driving said gear means.

* * * * *